Inventor:
Erich Seelbach
Hans Süss

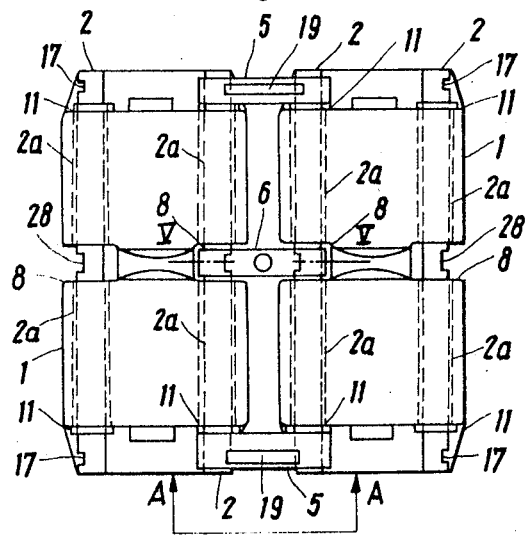
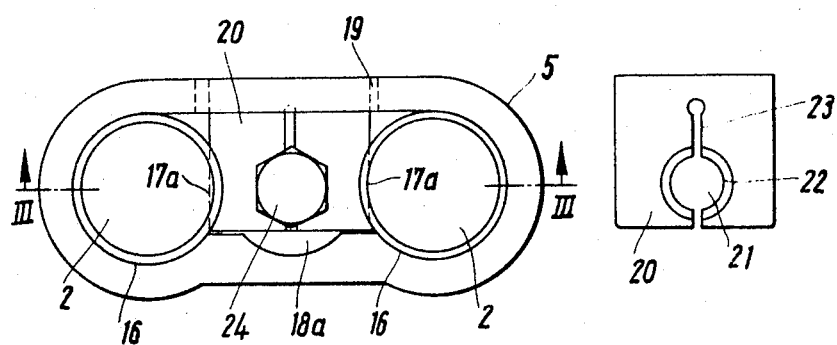

3,467,446
VEHICLE TRACK
Erich Seelbach, Luisenstrasse 1a, 401 Hilden, Germany, and Hans Suss, Am Ueling 99, Remscheid, Germany
Filed July 24, 1967, Ser. No. 656,984
Claims priority, application Germany, July 22, 1966,
T 21,097, T 31,660
Int. Cl. B62d 55/08
U.S. Cl. 305—57  8 Claims

ABSTRACT OF THE DISCLOSURE

A pair of adjacent links of a track for track-laying vehicles are arrayed in the direction of travel of the track. Each link has a pair of ends extending transversely of travel and each having an extension projecting therefrom. A pair of coupling pins are provided on each of the links and extend with opposite end portions thereof in the direction of the respective extension in substantial parallelism therewith. A roller is mounted on each projecting end of each pin for turning movement relative thereto. An end connector is located at the opposite ends of the links and connects one pin of each link to an adjacent pin of the next link so that the links are connetced for pivotal movement relative to one another.

Background of the invention

The present invention relates to track laying vehicles in general, and more particularly to tracks for such tracklaying vehicles.

Different types of tracks for tracklaying vehicles are known. There are rubber tracks and there are metal tracks, the latter being particularly found in vehicles where the danger to the track from rough terrain to be traversed, or from enemy action in the case of tracklaying combat vehicles, is too great to make the use of rubber tracks practicable. The present invention is particularly concerned with the type of tracks where the links consist of metal which are connected by end connectors and by center connectors.

In tracks of this type each link extends transversely of the direction of travel of the track. For the purpose of the hereafter following specification the longitudinal faces of each link, which face in the direction of travel and opposite this direction, will be known as the side faces, whereas the faces of the links which face transversely of the direction of travel will be known as the end faces. Furthermore, each link has a ground-engaging face which engages the surface when the track moves and a face which is directed oppositely the ground-engaging face.

In tracks of this type which are known from the prior art, the connecting pins or coupling pins connect beyond the end faces of the links, as do the end connectors which are carried by the projecting ends of the coupling pins. The center connectors which consist of two halves and which are removably secured, usually by way of a thread-carrying arrangement, on the coupling pins, for which purpose the links are each provided with a recess extending from one side face to the other and thus exposing the coupling pins for engagement by the center connectors, serve not only for connecting the adjacent links to one another and for transmitting motion derived from the sprocket wheels or similar drive means; rather, one half of each center connector is provided with a guide projection which extends into a groove of one, or into a space between two adjacent road wheels of the vehicle, that is the wheels which do not serve to transmit motion to the track but rather to support the track in its proper position. The purpose of this projection is, of course, to prevent lateral displacement of the track with respect to the road wheels, that is to prevent sliding-off of the track from these wheels. The drive sprockets or similar drive means have engaging teeth which engage in the spaces between the end connectors which connect adjacent ones of the links and which teeth thus serve to transmit motive power to the track.

In these known track constructions the links are each provided with bores extending from one to the other end face and the coupling pins are received in these bores. Each of the coupling pins is embedded in one of the bores with a mass of rubber or synthetic plastic material in such a manner as to prevent turning movement of the pin with reference to the link, regardless of whether such turning movement should take place together with or independently of the rubber or synthetic plastic material. Similarly, the connection between the end connectors and the respective coupling pins is such that no relative turning movement can take place and thus any pivotal movement of any one of the links with respect to the next adjacent link or links occurs exclusively as a result of deformation of the rubber or elastomeric material in which the pins are embedded. It is evident that this represents a highly destructive strain on the rubber or plastic material, a strain which increases in proportion to the length of the individual links of the track, such length being the greater the heavier the vehicle supported on the track. Furthermore, it will be evident that the projecting end portions of the coupling pins, which carry the end connectors, are particularly susceptible to damage. Thus, when the vehicle must traverse rough terrain, and if therefore there is frequent tilting of the track transversely to its direction of advancement, the end connectors become damaged very quickly and must be frequently replaced. Evidently, such damage is not confined to the end connectors but also extends to the projecting portions of the coupling pins which are deformed. Also, and this has already been pointed out, the transmission of the forces thus active to the rubber or elastomeric material in which the coupling pins are embedded will quickly destroy this material and necessitate expensive and time-consuming repairs. A further disadvantage is the fact that extraneous materials are frequently drawn into the track and become lodged in the projecting portions of the coupling pins and in the end connectors which are of course not protected because they project laterally beyond the track. Thus, if a tracklaying vehicle traverses a barbed wire fence or the like, such entanglement is very likely to take place and to result in damage to the track or, at the very least, to detrimental effects on the operation of the vehicle.

A further disadvantage of tracks of this type is the fact that the guide projection is provided on one half of the center connector. This makes it inevitable that forces which are transmitted to the guide projection by the road wheels are passed on to the rubber or synthetic plastic material, which hereafter for the sake of expediency will be referred to as the elastomeric material, and will tend to have destructive effects on this elastomeric material. Aside from detrimental effects on the elastomeric material, however, there is also the fact that such forces, if they act in direction transversely to the movement of the track, frequently result in loosening of separation of the screw connection between the two halves of the center connector, one half of which carries the guide projection. This is particularly true—and particularly unwanted—in case of combat vehicles where turning maneuvers must often be carried out at relatively high speed. Of course, as soon as a loosening of the screw connection between the two halves of one of the center connectors has taken place, the stresses acting on the center connector through the intermediary of the guide projection can incline the halves of the center connector with respect to the coupling pins on which the halves are secured, and the edges of the two halves of the center connector are forced into the material of the coupling pins which they groove deeply, a condition which frequently leads to breakage of the coupling pins. Even if this does not take place immediately, the improper guidance of the track by the guide projection which, when the connection between the two halves of the center connector is loosened, is able to "wobble," leads to considerably increased friction between the road wheels and the guide projection in question, and consequently to accelerated destruction of one or both.

It has already been pointed out that in tracks of the type here under discussion the center connectors are enabled to engage the coupling pins because of a recess or groove provided in each of the links and extending from one to the other of the side faces thereof. This, however, weakens these links and creates problems particularly under circumstances where the two halves of the center connector are not properly connected to one another and to the pins, thus further weakening the links at these points. Furthermore, it is also to be remembered, as pointed out earlier, that the teeth of the drive sprockets engage between the adjacent end connectors and that the motive power is transmitted to the track in this manner. Thus, in addition to the tensile stresses which act upon them as discussed before, the end connectors are further subjected to stresses resulting from engagement by these teeth and are subjected, together with the elastomeric material in which they are embedded, to additional wear resulting from this circumstance.

The problems set forth herein until now are by no means exhaustive of the difficulties encountered with the type of track under discussion. They have been outlined only as indicative of the general difficulties which exist, and to point out the very definite need for an improvement in this situation.

Summary of the invention

The present invention overcomes the disadvantages set forth above.

More particularly, the present invention provides a track for a tracklaying vehicle which is not subject to the various problems recited earlier.

Still more particularly, the present invention provides a track of the type set forth in which previously exposed parts of the track are largely protected against the type of damage encountered heretofore, and discussed earlier.

The track according to our invention is so constructed that the transmission of stresses takes place in an entirely different manner that known from the prior art.

In accordance with one feature of our invention we provide, in a track for a tracklaying vehicle, a pair of adjacent links which are arrayed in the direction of travel of the track and which are elongated transversely to this direction. Each of these links, which may be cast or forged of steel or the like, has a ground-engaging face and an opposite face and is of a given thickness between these faces. Furthermore, each link has opposite end portions which are respectively provided with a longitudinally projecting extension which has a thickness smaller than the given thickness between the ground engaging face and the opposite face. A pair of coupling pins is provided on each of the links and extends longitudinally thereof intermediate the ground engaging face and the opposite face. These pins received in longitudinally extending bores and embedded in elastomeric material, such as rubber or synthetic plastic material. Each of the pins has a pair of end sections projecting beyond the respective end portions of the link with which it is associated, and extending in substantial parallelism with the extensions on the end portions. A roller of hardened material is mounted on each of these projecting end sections for turning movement relative thereto, and an end connector is located at the opposite ends of the adjacent links and connects an end section of one coupling pin of one of the links with an end section of the adjacent pin of the other link.

It is evident that the links can now pivot relative to one another without the elastomeric material in which the pins are embedded having to take part in such pivoting movement. Furthermore, in accordance with our invention, the teeth of the drive sprockets or similar drive means on the vehicles, which serve to advance the track in its direction of travel, now engage between the hardened rollers of the connected coupling pins of the connected links, rather than engaging between the adjacent end connectors, thus freeing these end connectors from the strain and from the wear to which they were previously subjected as a result of such engagement.

To overcome the disadvantages heretofore present in the type of link wherein a groove was provided extending from one side face to the other and from the ground-engaging face to the opposite face, the center connector being received in such groove, our invention provides that the groove should still extend from one side face to the other but should extend from the ground-engaging face toward but short of the opposite face. It is evident with these circumstances the guide projection can no longer be provided on one half of the center connector. The center connector is, in fact, still in two halves which are placed on opposite sides of the exposed coupling pins in the recess and which are secured to one another by a screw and bolt arrangement or the like. The guide projection, however, is now provided as an integral part, for instance by being forged onto or cast onto the link itself, and it bridges the recess in the link at the opposite face thereof. Thus, any forces transmitted to the guide projection are no longer forwarded by the same to the coupling pins as was the case herebefore.

It is another concept of our invention that the end sections of the coupling pins overlie the respective extensions on the links, but do not project longitudinally therebeyond, so that they are protected by these extensions and so that these end sections, together with the end connector which are similarly protected by the longitudinally projecting extensions on the links, will no longer be damaged or deformed by contact with the ground and will no longer have such a pronounced tendency to draw extraneous matter, such as barbed wire or the like, into the track.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 3 is a top-plan view of two links of the type shown in FIG. 1;

FIG. 4 is a view taken in the direction of the arrows A—A in FIG. 3;

FIG. 6 is an end-view of one of the elements employed in the embodiment of FIG. 3.

Description of the preferred embodiments

Figure 1:
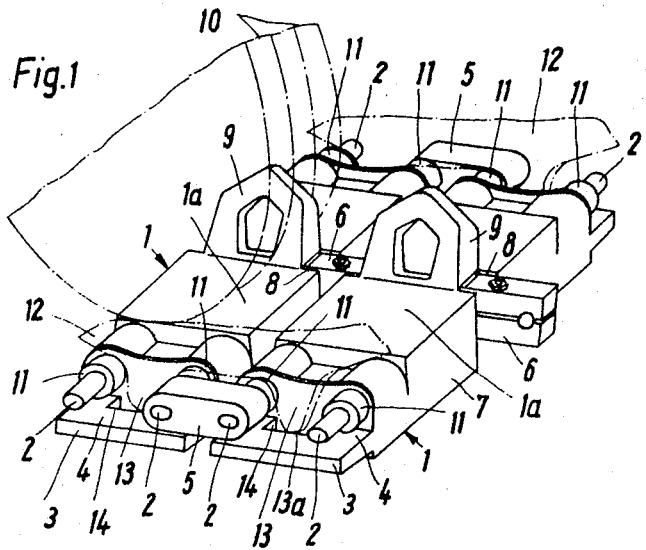
FIG. 1 is a somewhat schematic view of two connected links of a track according to the present invention.

Discusing now the drawing in detail, and firstly FIG. 1 thereof, it will be seen that this shows two track links 1 which may, as pointed out earlier, consist of various different, preferably metallic materials, and which may be forged or cast. Each of the links 1 is provided with two bores (not identified with reference numerals) extending between the end faces 3 of the links, and received in each of these bores, embedded in rubber or synthetic plastic elastomeric material (not shown) is a coupling pin 2 projecting with an end section out of the respective bore. It is to be noted that the terminal faces of coupling pins 2 are flush with the end faces 3 of the respective links 1, rather than projecting therebeyond as was the custom heretofore. Each of the end faces 3 is provided intermediate the lateral faces 7 of each link with an inwardly extending recess 4 which is open to the upper surface 1a which is opposite the ground-engaging surface (not identified with reference numeral) of the respective link 1. Thus, and this is clearly evident from FIG. 1, each projecting end section of each of the pins 2 is upwardly spaced from the projecting extensions of the link which is thus created, and is thus readily accessible.

The links 1 are connected together by end connectors 5 which each engage the two adjacent pins 2 of the longitudinally arrayed links 1 in a manner which will still be described hereinafter. In addition to the end connectors 5, there are provided center connectors 6 which serve to connect the links 1 intermedaite the ends thereof. For this purpose each of the links 1 is provided in its ground engaging face where the recess 8 which extends from one transverse face 7 to the other transverse face 7 and upwardly to the face 1a. The center connectors 6 are provided for the same purpose as the end connectors 5 and are in fact reminiscent of the latter. They differ from them in that they consist of two sections, as is clearly illustrated in FIG. 1, which are placed on opposite sides of the pins 2 which are to be connected, and then secured to one another by a suitable screw or bolt arrangement 6a. This latter is entirely conventional and need therefore not to be illustrated in more detail. The connection effected by the center connectors is of course the same as with the end connectors 5 in that each center connector 6 engages one of the pins 2 of one link and the adjacent pin 2 of the next link. Unlike the prior-art constructions, however, the guide projections, which are here identified with reference numeral 9, are not provided on one half of the center connectors 6. Rather, they constitute an integral part of each link 1 and are cast or forged thereonto. It is these guide projections 9 which are received in a circumferential groove provided in a road wheel 10 (shown in phantom lines) or in a space provided between two adjacent but laterally spaced wheels 10.

The end connectors 5 are secured to the projecting sections of the pins 2, as already pointed out and as shown in FIG. 1. Inwardly of the end connectors 5, however, the projecting end sections of the pins 2 each carry a roller 11 of hardened material which is freely turnable with respect to its associated pin 2 and FIG. 1 shows, also in phantom lines, that the teeth 13 of the drive sprocket 12 provided on the vehicle, and not illustrated in more detail because entirely conventional, engage not the end connectors 5 but extend between the adjacent rollers 11 of the connected ones of the pins 2. To facilitate proper introduction of these teeth 13, if this is necessary, the longitudinal extension of each link 1 may be provided with a cutout 14 intermediate its adjacent pins 2, as also illustrated in FIG. 1. Such cutout can then accept the tip 13a of the respective teeth 13.

Figure 2:
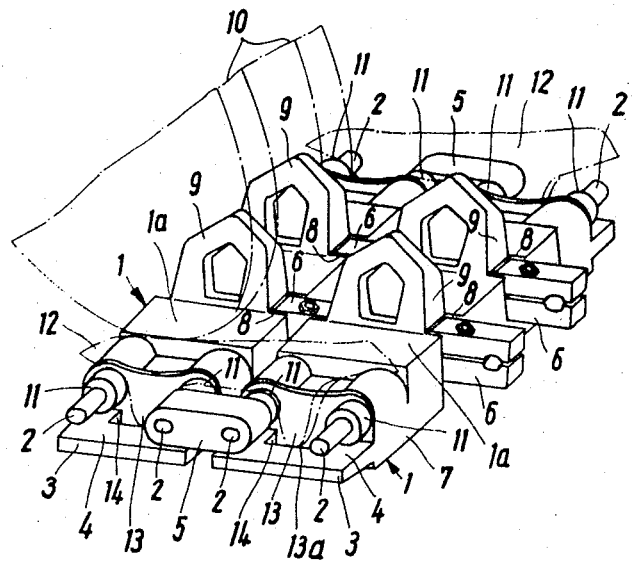
FIG. 2 is a view similar to FIG. 1, but showing the same embodiment in a track for a heavier vehicle.

Coming now to the embodiment of FIG. 2 it will be seen that this is largely the same as that shown in FIG. 1. It differs from the former in that it is intended for heavier tracklaying vehicles and comprises for each of its links 1 two of the recesses 8, two of the center connectors 6 and two of the guide projections 9. Other than this the embodiment of FIG. 2 is the same as the embodiment of FIG. 1 and need therefore not be described in any further detail.

Coming now to the embodiment illustrated in FIG. 3 it will be seen that this is a top-plan view illustrating the two links shown in FIG. 1. It is clearly evident from this figure, in which like reference numerals again indicate like elements. That the links 1 each are again provided with two of the coupling pins 2 each of which carries on its projecting end section a roller 11. The coupling pins 2 in this instance are shown to be embedded in elastomeric material 2a and it will be remembered that this is of course present in the preceding figures although it was there not illustrated and did therefore not have a separate reference numeral.

Figure 5:
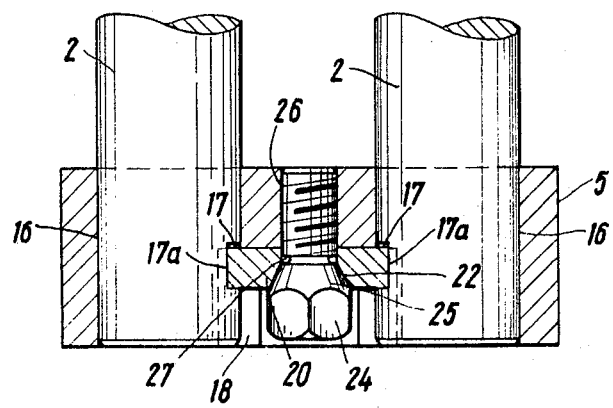
FIG. 5 is a section taken on the line III—III in FIG. 4.

FIGS. 4 and 5, which should be considered in conjunction with FIG. 3, show how the end connectors 5 are secured to the projecting end sections of the pins 2. In FIGS. 4 and 5 the end connectors are again identified with reference numeral 5 and it will be seen that they are each provided with two openings 16 which receive the projecting end sections of the pins 2 as illustrated in FIG. 3. The thus-connected end sections of these pins are each provided on sides which face one another with a recess 17, as is clearly illustrated in FIG. 5 and also evident from FIG. 3. The bottom walls of these recesses are identified with reference numeral 17a and it will be seen that they extend in parallelism with one another although they are of course transversely spaced. The end connector 5 is provided, as evident from FIGS. 4 and 5, with a bore 18 extending in substantial parallelism with the apertures 16 and with a cutout 19 which extends transversely of these apertures 16 and the bore 18 and which communicates with all three. The cutout 19 accepts a plate-shaped member 20 (shown in FIG. 6 in detail) which, when received in the cutout 19, projects with its lateral edges into the recesses 17 of the pins 2, as evident from FIG. 5. FIG. 6 illustrates this plate-shaped member 20 and shows that it is provided with a bore 21 bounded by a converging cam face 22 and provided with a slot 23 which bisects the bore 21. When the plate member 20 is received in the cutout 19, it is so introduced that the slot 23 extends parallel to the bottom faces 17a of the respective recesses 17. Thereupon, a screw 24 (compare FIG. 4) is introduced into the bore 18 through the bore 21 of plate member 20 and threaded into screw threads provided in the bore 18. The head of the screw 24 converges in forward direction. This is indicated in FIG. 5 where the head is indicated with reference numeral 25 and it will be clear that, as the screw is introduced deeper into the bore 18, this substantially conical head 25 will engage the complementarily configurated cam face 22 and will serve to spread the plate member 20 because of the presence of the slot 23. Thus, the lateral edge portions of the plate member 20 will be pressed firmly against the bottom wall surfaces 17a of the recesses 17 in the pins 2. The back pressure which results against the head 25 serves, of course, to effectively prevent undesired loosening of the same.

It will be evident, of course, that when the screw is thus prevented from loosening, special handling is necessary to release this connection. The screw 24 can of course be removed without difficulty. Once this is done, a tool is inserted under the plate member 20 and this is pushed through and out of the recess or cutout 19 which, as is evident from the drawing, extends into the end connector 5 only from one side and is thus blind. To facilitate introduction of the appropriate tool, a depression 18a is provided in the bore 18, as shown in FIG. 4, so that the tool can be introduced underneath the plate member 20.

FIG. 5 shows that the screw 24 is weakened at the point where the shaft 26 and the head 25 join. To this end, a circumferential recess 27 is provided whose diameter is advantageously smaller than the root diameter of the threads on the shaft 26. The purpose of this arrangement is to assure that, if excessive stress acts upon the screw 24, the screw will break at the recess 27, that is at the point at which it is weakest, whereas the shaft 26 will remain in place and continue to hold the plate member 20 in its position. Thus, even if the screw 24 breaks in this manner, axial shifting of the end connector 5, and consequent loss thereof and separation of the links connected thereby, are prevented even under these circumstances.

Figure 7:
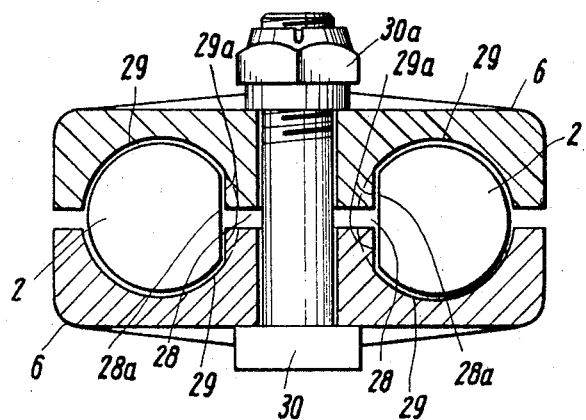
FIG. 7 is a section taken on the line V—V of FIG. 3.

FIGS. 3 and 7 shows that where the connecting pins 2 are exposed in the recesses 8 of the links 1, each pin 2 is provided with a cutout 28 substantially corresponding to the cutouts 17, whereby again the bottom walls 28a of these cutouts extend in parallelism with one another. Each of the center connectors 6, which are shown clearly in FIG. 7, consists of two halves which are connected by means of a screw 30 and nut 30a, is provided on its semicircular engagement face 29 with a planar section 29a which engages one of the bottom walls 28a of the cutouts 28, thus assuring that the pins 2 cannot turn relative to the end connectors 5 and the links 1.

The advantages of the invention herein disclosed will be obvious. With the construction shown, each of the links 1 is a unitary structure which cannot and does not flex in itself, which cannot be twisted and which therefore cannot transmit forces to the elastomeric material in which the pins 2 are embedded. In view of the fact that there can no longer be any contact of the projecting end sections of the pins 2 with the ground or with obstacles on the ground, because of the protection afforded by the extensions on the links 1, damage to these projecting end sections and the end connectors 5 is effectively prevented. Similarly, damage to the elastomeric material in which the pins 2 are embedded can no longer result from the transmission of forces onto these pins from the drive means, because the drive means now contacts the rollers 11 which are free to turn with respect to the pins 2 so that the transmittal of forces is minimal. Also, wear and tear on the end connectors is greatly reduced because the drive means no longer contacts the end connectors and no longer subjects the same to any kind of wear. The guide projections at the middle of each of the links 1 are no longer provided on the center connectors, thus eliminating a source of force transmittal into the elastomeric material embedding the pins 2, and at the same time increasing the strength for each of the links 1 because the guide projections are now integral with these links 1. At the same time, this arrangement reduces greatly the danger that the screw connection uniting the two halves of each of the center connectors can become loosened or separated, as was heretofore the case. Lacking this, there is then also no longer any danger that grooves might be cut into the pins 2 by tilting of the halves of the center connectors with respect to the pins, and engagement of their edges with the pins, and the danger of breakage of the pins 2 is then accordingly also reduced greatly. The particular arrangement of the end connectors, and the way in which they are secured to the pins 2, assures that they cannot come off even if the screws 4 should break, for the reasons described before, and this affords considerable additional safety against separation of the track links. Furthermore, this arrangement helps to positively prevent turning of the pins 2 relative to the links 1 or relative to the elastomeric material in which they are embedded, and it also makes possible a reduction in the material thickness of the end connectors because these are no longer weakened in the manner known from the prior art.

It will be understood that each of the elements described above, or two or more together, may also find a useful application in other types of tracks differing from the types described above.

What is claimed as new and desired to be protected by Letters Patent is set forth in the appended claims:

1. In a track for a track-laying vehicle, a pair of adjacent one-piece links arranged in the direction of travel of said track and being elongated transversely to said direction, each of said links having a ground-engaging face and an opposite face and being of a given thickness between said faces, and said links each further having opposite end portions respectively provided with a longitudinally projecting extension having a thickness smaller than said given thickness; a pair of coupling pins provided on each of said links extending longitudinally thereof intermediate said faces and having respective end sections projecting beyond the respective end portions in substantial parallelism with said extensions in the space between the same and said opposite face, said end sections of said pins projecting at most to the end face of the respective extension; a roller mounted on each of said end sections for turning movement relative thereto, and adapted to be engaged by advancing means provided on said vehicle for advancing said track in said direction; an end connector located at the opposite ends of said links and connecting an end section of one coupling pin on one of said links with an end section of the adjacent coupling pin of the other link, whereby said links are connected for pivotal movement relative to one another without affecting freedom of rotation of the respective rollers; center connecting means located intermediate said opposite ends of said links and connecting said coupling pin of said one link with said adjacent coupling pin of said other link; and track guide means of one piece with the respective link and projecting from said opposite face thereof intermediate said end faces.

2. In a track as defined in claim 1, wherein each of said extensions is provided intermediate the end sections of said pair of pins with a recess in direction from said opposite face toward said ground-engaging face and adapted to accommodate projecting engaging portions of advancing means for said track which project intermediate said end sections and into engagement with the rollers mounted on said end sections.

3. In a track as defined in claim 1, wherein said end sections have outer free ends, and wherein the associated end sections of said one pin and said adjacent pin extend substantially parallel to one another and are provided inwardly of said free ends thereof with a pair of transversely aligned slots each having an open side facing the other slot; said end connectors each comprising an engaging portion projecting into the respective transversely aligned slots.

4. In a track as defined in claim 1, wherein said links are each provided with a recess extending in substantial parallelism with said end faces and toward but short of said opposite face of the respective link, said coupling pins being received in bores provided in said links extending intermediate said end faces; and wherein said center connecting means comprises an elongated connecting member including two halves each having two longitudinally spaced transverse recesses and connecting means connecting said halves together whereby, when said halves are placed in facing relationship which said recesses each partly surrounding one of said pins, said connecting member connects said links intermediate said opposite ends, and further comprising cooperating abutment faces provided on said coupling pins and on said connecting member and preventing turning movement of the former relative to the latter.

5. In a track as defined in claim 3, wherein said end connectors are each provided with a pair of bores adapted to at least partly receive said end sections and with a cutout extending transversely of said bores connecting the same and being in registry with said slots, and wherein said engaging portion is an insert plate received in said cutout and extending into said slots.

6. In a track as defined in claim 5, wherein said plate and said end connector are provided with registering bores parallel to said pair of bores intermediate the same, said plate further being provided with a radial slot extending from an edge portion of said plate to said registering bore thereof, and wherein said end connector comprises an expanding bolt adapted to be anchored in said registering bores and to expand said plate for deeper penetration into said slots.

7. In a track defined in claim 6, wherein said expanding bolt has a head and a shaft, said expanding bolt and said registering bore in said end connector being provided with mating screw-thread, said expanding bolt being further provided on said head with a cam face adapted to engage a complementary cam face on said plate whereby to expand the latter in response to rotation of said bolt in a sense effecting deeper penetration of said bolt.

8. In a track as defined in claim 7, wherein said shaft of said expansion bolt is provided with a weakened portion adjacent to said head.

References Cited

UNITED STATES PATENTS

| 1,485,046 | 2/1924 | Morgan | 305—52 |
| 2,061,229 | 11/1936 | Fergusson | 305—56 |
| 2,738,236 | 3/1956 | Haushalter | 305—36 |
| 3,231,316 | 1/1966 | Ruf | 305—57 X |

RICHARD J. JOHNSON, Primary Examiner

U.S. Cl. X.R.

305—58